(12) United States Patent
Krabbenhöft

(10) Patent No.: US 6,389,161 B1
(45) Date of Patent: May 14, 2002

(54) METHOD OF INTERPOLATION IN AN N-DIMENSIONAL COLOR SPACE

(75) Inventor: Uwe-Jens Krabbenhöft, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/269,839
(22) PCT Filed: Aug. 16, 1997
(86) PCT No.: PCT/DE97/01758
§ 371 Date: May 17, 1999
§ 102(e) Date: May 17, 1999
(87) PCT Pub. No.: WO98/16057
PCT Pub. Date: Apr. 16, 1998

(30) Foreign Application Priority Data

Oct. 10, 1996 (DE) .......................................... 196 41 822

(51) Int. Cl.$^7$ .................................................. G06K 9/00
(52) U.S. Cl. ........................ 382/167; 358/518; 358/525
(58) Field of Search ................................. 382/162, 167; 358/518–540; 345/589–591, 593–600, 606–610

(56) References Cited

U.S. PATENT DOCUMENTS

| | | |
|---|---|---|
| 4,477,833 A | 10/1984 | Clark et al. |
| 5,422,738 A | 6/1995 | Ishihara et al. |
| 5,428,465 A | 6/1995 | Kanamori et al. |
| 5,483,360 A | 1/1996 | Rolleston et al. |
| 5,504,821 A | 4/1996 | Kanamori et al. |
| 5,519,515 A | 5/1996 | Komatsu |
| 5,592,591 A | 1/1997 | Rolleston |
| 5,600,764 A | 2/1997 | Kakutani |
| 5,625,378 A | 4/1997 | Wan et al. |
| 5,677,967 A * | 10/1997 | Pariser ........................ 382/167 |
| 5,717,507 A * | 2/1998 | Vondran ...................... 358/525 |
| 5,784,065 A | 7/1998 | Kakutani |
| 6,292,195 B1 * | 9/2001 | Shimizu et al. .............. 345/431 |
| 6,301,025 B1 * | 10/2001 | Delean ........................ 358/518 |

FOREIGN PATENT DOCUMENTS

| | | |
|---|---|---|
| EP | 2 307 402 | 9/1994 |
| EP | 0 626 782 | 11/1994 |
| EP | 0 647 061 | 4/1995 |
| GB | 2 053 619 | 2/1981 |
| JP | 8-195890 | 7/1996 |
| JP | 8-228296 | 9/1996 |

* cited by examiner

Primary Examiner—Amelia M. Au
Assistant Examiner—Jingge Wu
(74) Attorney, Agent, or Firm—Schiff Hardin & Waite

(57) ABSTRACT

In a method for interpolating color values with a view to converting an initial color space into an output color space, the initial color space is divided into a multidimensional network. For grid points, converted components of the output color space are prescribed as interpolation nodes. The converted components, located between the grid points are obtained by interpolating said nodes. For the purpose of interpolation, the components of an initial color to be interpolated are broken down in a multiple of the grid point spacing and a remainder, and the remaining values are classified by order of magnitude. At the grid points of a sub-space comprising the initial color to be interpolated, the interpolation nodes are selected in a series determined by the classification of the remaining values, and the initial color is interpolated based on the selection of interpolation nodes. The inventive method can be used without significantly increasing the calculation work for the initial grid space and the output color space with any number of dimensions.

6 Claims, 7 Drawing Sheets

METHOD OF INTERPOLATION IN AN N-DIMENSIONAL COLOR SPACE

BACKGROUND OF THE INVENTION

The invention is in the field of electronic production technology and is directed to a method for interpolation of color values for color space transformation from an input color space into an output color space.

In reproduction technology, print masters for printed pages are produced that contain all elements to be printed such as texts, graphics and images. In the case of electronic production of print masters, these elements are present in the form of digital data. The data for an image are generated, for example, in that the image is scanned point-by-point and line-by-line in a scanner, each picture element is resolved into color components, and the color components are digitized. Usually, images are resolved into the color components red, green and blue (RGB) in a scanner, i.e. into the components of a three-dimensional color space. However, other color components are required for color printing. These are the inks cyan, magenta, yellow and black (C, M, Y, K) given four-color printing, i.e. the components of a four-dimensional color space. In special instances such as packaging printing, even more inks can be added, for example gold, silver, chocolate brown, etc. For prints with especially high quality (high fidelity printing), for example, seven inks are employed (C, M, Y, K, R, G, B), i.e. the image data must be transformed into a seven-dimensional color space.

Such color space transformations are required in reproduction technology because there are different color spaces for different devices such as scanner, monitor, proof output, printing machine, etc., these different color spaces respectively optimally describing the color properties of the device. All devices have their limitations and special characteristics in the presentation of the colors, and all devices have properties of this type that are different. The color components of the various color spaces are allocated to one another with a color space transformation, so that, for example, RGB color values that a scanner identified are transformed into the CMYK color values of a printing process so that the print has the same colors as the image original.

Such an allocation can be realized with the assistance of a table memory (lookup table). When, for example, RGB color values are to be transformed into CMYK color values, the table memory must have a memory location for every possible value combination of the RGB color components, the allocated CMYK color components being stored therein. An RGB image is then transformed into the CMYK color space in that the RGB color values of every picture element are applied to the table memory as an address and the allocated CMYK color values are read out. This simple allocation method, however, has the disadvantage that the table memory can be very large and, thus, expensive. When each of the RGB components was digitized with eight bits, i.e. has $2^8=256$ density levels, there are $256^3=16,777,216$ possible value combinations of the RGB color components. The table memory must thus have 16,777,216 memory cells, each with a 4-byte word length (one respective byte for C, M, Y, K). The table memory thus becomes 64 M bytes large.

In order to reduce the size of the table memory, the prior art utilizes a combination of table memory and interpolation method for realizing a color space transformation. The allocations for all possible value combinations of the input color components are then not stored in the table memory; rather, only those for a coarser, regular grid of values in the input color space. The grid is formed in that only every $k^{th}$ value is taken as a grid point in every component direction. For the example of the RGB color space and for k=8, thus, every eighth value of the 256 possible values is taken in every components as grid point. The grid, accordingly, has 256/8=32 grid points in each component direction, i.e. 32×32×32=32,768 grid points for the entire color space. The allocated components of the output color space (for example, CMYK) are stored in the table memory as supporting values for every grid point. The output values are interpolated from the neighboring supporting values for input color values that lie between the grid points.

The interpolation methods for the color space transformation known from the prior art are usually limited to three-dimensional input color spaces such as, for example, the RGB color space. They cannot be applied to a four-dimensional or multi-dimensional input color space such as, for example, the CMYK color space or the seven-dimensional CMYKRGB color space or, given an expansion to more than three dimensions, they require a great deal more expense or, respectively, calculating time. In European published application 0 487 304, all eight corner points of a sub-cube in the three-dimensional L*a*b* color space are employed for the interpolation. In European published application 0 615 379, the color values are likewise interpolated from all eight corner points of a sub-space in the RGB color space, whereby the grid points, however, are not equidistant, i.e. the sub-space is not cube-shaped.

In German Letters Patent 28 13 519, the cube-shaped sub-space is divided into 5, 6 or 24 tetrahedrons, the tetrahedron in which the point P should lie is determined from the spacings of the point P to be interpolated from the sides of the sub-cube, and the color value is then interpolated from the four corner points of this tetrahedron.

In German Published Application 42 34 985, the sub-cube of the three-dimensional input color space is likewise divided into six tetrahedrons and the four corner points of a tetrahedron are then interpolated.

In U.S. Pat. No. 5,428,465, each sub-cube in the RGB color space is divided by a diagonal parting plane into two prisms each having six corner points, and the color values in the inside of a prism are interpolated from the six corner points. In the same way, the sub-cubes of a three-dimensional color space with a luminance component and two color difference components are divided in U.S. Pat. No. 5,504,821 into two prisms each having 6 corner points and the color values within a prism are interpolated from all 6 corner points.

In GB Published Application 2 053 619, the sub-cubes are divided into three pyramids with respectively 5 corner points and the color values within a pyramid are interpolated from the corner points.

In U.S. Pat. No. 5,313,314, a four-dimensional "sub-cube" having 16 corner points is divided into 24 sub-members each having five corner points, and the five corner points of the sub-member are then interpolated.

In European Letters Patent 0 533 712, a general transformation from an n-dimensional into an m-dimensional color space is disclosed, whereby the components of the input color space are imaged by pre-processing onto a three-dimensional color space, and the general n-dimensional transformation is thus reduced to a three-dimensional transformation.

The majority of known interpolation methods for color space transformation are limited to a three-dimensional input color space in that a sub-cube is divided into a plurality of sub-members. To that end, the components of a color value to be interpolated are divided into multiples of the edge length of a sub-cube and remainders. As a rule, a plurality of more significant bits indicates the multiple values and the remaining, low significance bits indicate the remainders. The multiple values of the components indicate in which sub-cube the color value to be interpolated lies. The remainders indicate further in which sub-member of the sub-cube the color value to be interpolated lies. A determination of the sub-member in which the point P to be interpolated lies is made by extensive comparison operation of the low-significant bits, the corner points of the sub-member are determined by an address calculation, and the corresponding supporting values are taken from a three-dimensional grid table memory and are interpolated. The methods are involved and involve a great number of calculating operations for each color value of a picture element to be interpolated. An expansion of these methods to more than three dimensions is either not possible or becomes so involved that application thereof is not economically feasible.

SUMMARY OF THE INVENTION

It is therefore an object of the present invention to avoid the aforementioned limitations and disadvantages and to specify a method for interpolation of color values for color space transformation from an input color space into an output color space with which color spaces having an arbitrary number of dimensions can be transformed into one another.

This object is achieved by a method according to the invention wherein for interpolation of color values for color space transformation from an input color space into an output color space, the input color space is divided into a multi-dimensional grid. Transformed components of the output color space are prescribed for grid points as supporting values. A transformed component of the output color space for input colors that lies between the grid points are acquired by interpolation of the supporting values. Within these method steps, the following additional method steps are performed. Components of an input color to be interpolated are divided into a multiple of grid point spacing and into a remainder. A sub-frame is determined from the multiples of the grid points spacing, namely a sub-space in which the input color to be interpolated lies and that is limited by respectively neighboring grid points in the components of the input color space. The remainders are sorted according to their size. Supporting values at limiting grid points of the sub-space are selected and sorted in a sequence, the sequence being defined by a sequence of the sorted remainders. Interpolation components are formed from the sorted remainders. The interpolation coefficients are operated with the sorted supporting values to form interpolated components of the output color space.

A simple interpolation method is employed that is not limited to three dimensions and for which the calculating expense given more than three dimensions becomes only insignificantly greater.

The invention is described in greater detail below with reference to FIGS. 1 through 8.

DESCRIPTION OF THE PREFERRED EMBODIMENTS

Figure 1:
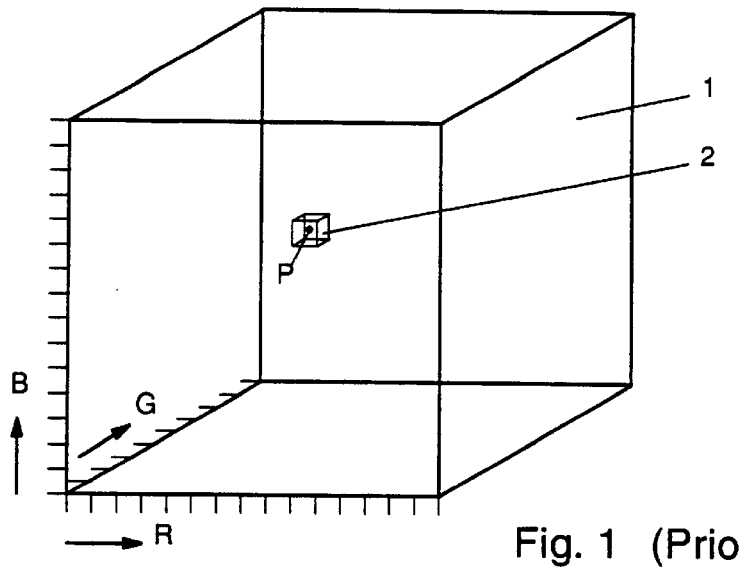
FIG. 1 is a three-dimensional RGB color space with a sub-cube in which the point P to be interpolated lies (prior art)

FIG. 1 shows the three-dimensional RGB color space as an example of an input color space, whereby the component axes form a cube 1 and each component is divided into 32 grid points. Respectively 2×2×2=8 spatially adjacent grid points form a sub-cube 2, i.e. the color space is divided into 32×32×32=32,768 sub-cubes. An RGB input color P, for which the color space transformation is to be implemented, lies in a sub-cube. The transformed color values for the grid points at the corners of the sub-cube are stored in the table memory as supporting values. The transformed color values of the input color P are determined from these neighboring supporting values by interpolation, whereby the interpolation coefficients are determined in a suitable way from the distances of the point P from the corner points of the sub-cube.

Figure 2:
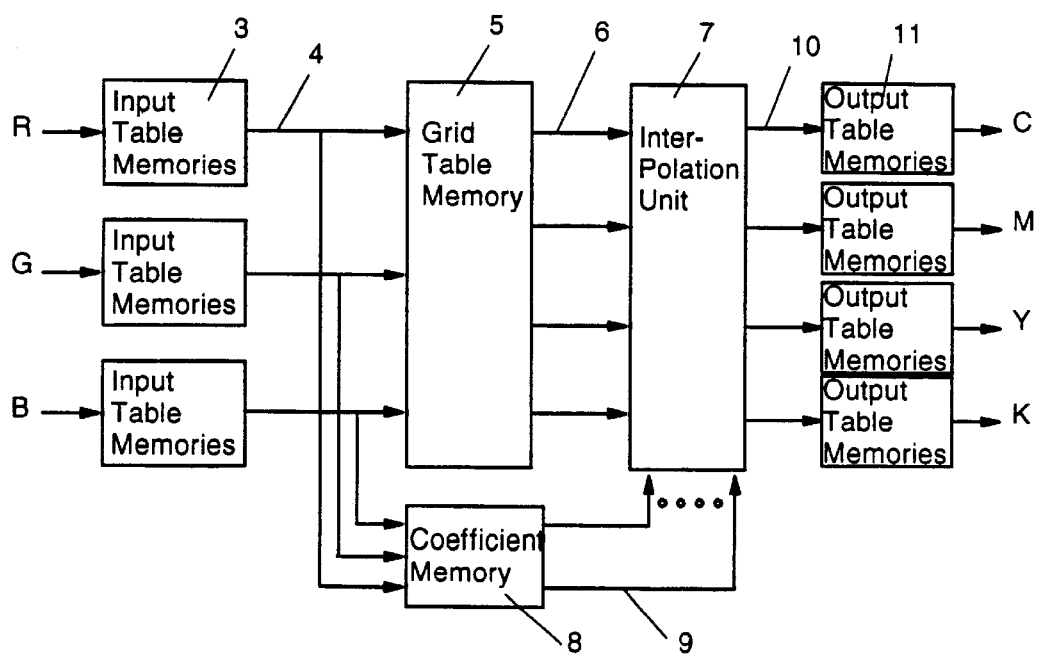
FIG. 2 is a block diagram of a color space transformation from RGB to CMYK with a grid table memory and an interpolation of the grid points (prior art)

FIG. 2 shows the basic method of color space transformation with table memory and interpolation as block diagram for an example in which the RGB color space is transformed into the CMYK color space. The RGB components are first modified by one-dimensional input table memories 3, for example to adapt in terms of their value range. When the RGB components are digitized, for example, with eight bits each, the input table memories have 256 memory locations of eight bits each (one byte). The output values 4 of the input table memory that are eight-bits wide are divided into five more-significant bits are three less-significant bits. A 15-bit wide address for the three-dimensional grid table memory 5 in which the supporting values of the 32×32×32=32,768 grid points are stored is formed from the 3×5=15 more-significant bits. This address characterizes the first corner point of the sub-cube 2 in which the point P to be interpolated lies. Four supporting values 6 corresponding to the four components of the CMYK color space are stored in the grid table memory for each grid point and are read out in parallel. Dependent on the interpolation method employed, a supporting value 6 of further corner points of all corner points of the sub-cube are read out from the grid table memory (5) and supplied to the interpolation unit (7). Parallel thereto, a nine-bit wide address for the coefficient memory (8) from which the interpolation coefficients (9) are read out and supplied to the interpolation unit (7) is formed from the 3×3×3=9 less-significant bits of the initial values (4) of the input table memory (3). The nine-bit wide address for the coefficient memory (8) identifies the position of the point P within the sub-cube (2) and, thus, also identifies its distances from the corner points of the sub-cube. The interpolation unit (7) operates the supporting values (6) of the corner points that have been read out with the interpolation coefficients (9) and calculates interpolated color values (10) in the CMYK color space, which can still be adapted in terms of their value range by one-dimensional output table memories 11. Numerous variations of this fundamental procedure are possible dependent on which of the calculating steps are implemented serially or in parallel.

The method of the invention for the interpolation of color values for a color space transformation works with a grid table memory and a following interpolation of the grid points, as was explained in FIG. 2. The method, however, is expanded to an arbitrary plurality of dimensions of the input color space and of the output color space.

Figure 3:
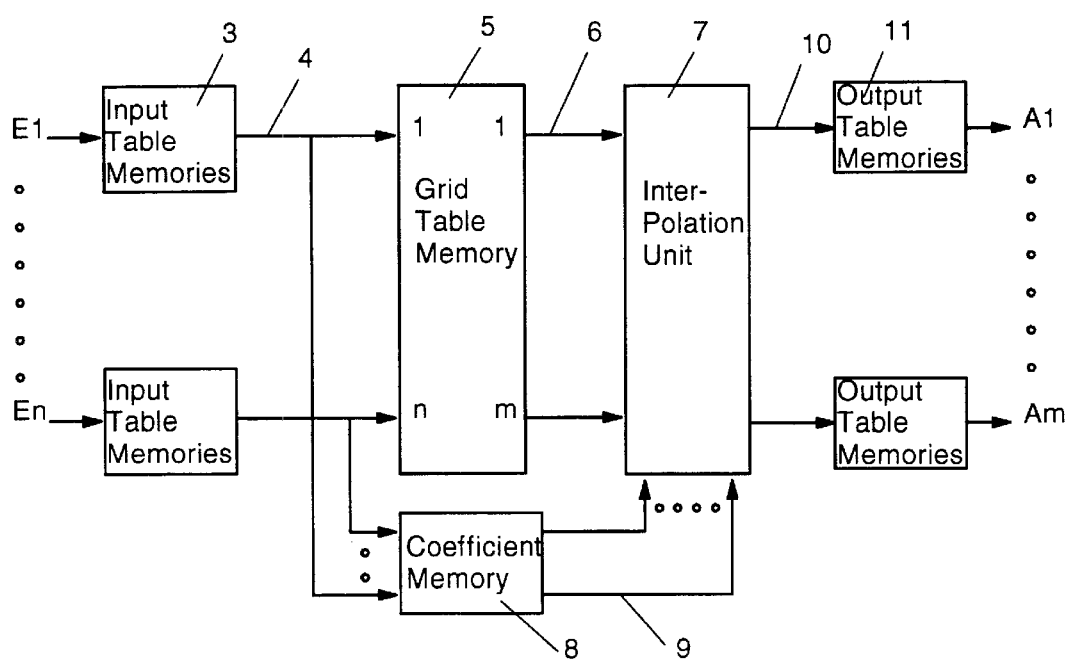
FIG. 3 is a block diagram for a color space transformation from n dimensions onto m dimensions with a grid table memory and an interpolation of the grid points.

FIG. 3 shows a block diagram for this generalized case. The components E1 ... En of the n-dimensional input color space are modified via input table memories 3. The output values (4) of the input table memories 3 are divided into more-significant and less-significant bits. The more-significant bits are combined to form an address for the n-dimensional grid table memory 5 in which supporting values (6) for grid points regularly distributed in the n-dimensional input color space are stored. Respectively two grid points neighboring in each component direction form a smallest sub-space having $2^n$ grid points as corner points. Corresponding to the m components of the output color space, m supporting values are stored for each grid point. The low-significant bits of the output values 4 are combined to form an address for the coefficient memory (8) from which interpolation coefficients 9 are read out. Dependent on the interpolation method, the supporting values of a plurality of corner points of a sub-space in which the point P to be interpolated lies are read out from the grid table memory and operated in the interpolation unit 7 with the interpolation coefficients 9 to form the interpolated color values 10. The interpolated color values 10 of all m output components are modified in the output table memories 11 and are then output as transformed color components A1 ... Am of the output color space. Numerous modifications are possible in addition to this procedure, for example the interpolation unit can calculate the interpolated color values 10 in chronological succession or in parallel for all m components or the interpolation coefficients 9 are calculated from the low-significant bits of the output values 4 and are not read out from the memory. A modification of the color values in the input table memories 3 and the output table memories 11 can also be calculated in advance into the stored supporting values 6, and these table memories can then be omitted. It is also possible to provide a separate grid table memory 5 and a separate interpolation unit 7 for each component of the output color space. All of these versions, however, do not change the basic procedure that supporting values 6 in a multi-dimensional grid table memory (5) are addressed with the more-significant bits of the input components, that interpolation coefficients 9 are acquired from the low-significant bits of the input components, and that output color values are interpolated from the supporting values 6 at a plurality of corner points of a sub-space.

The inventive interpolation method is described and illustrated first with reference to the example of a two-dimensional color space since it can no longer be graphically shown for more than two dimensions. It is then expanded later to an arbitrary number of dimensions of the input color space. The number of dimensions of the output color space has no influence on the fundamental execution of the interpolation method since the interpolation is implemented separately for each component of the output color space. The number of output components only influences the number of supporting values stored per grid point in the grid table memory and the number of identical interpolations to be implemented in parallel or successively. The inventive interpolation method is therefore explained here only for one output component.

Figure 4:
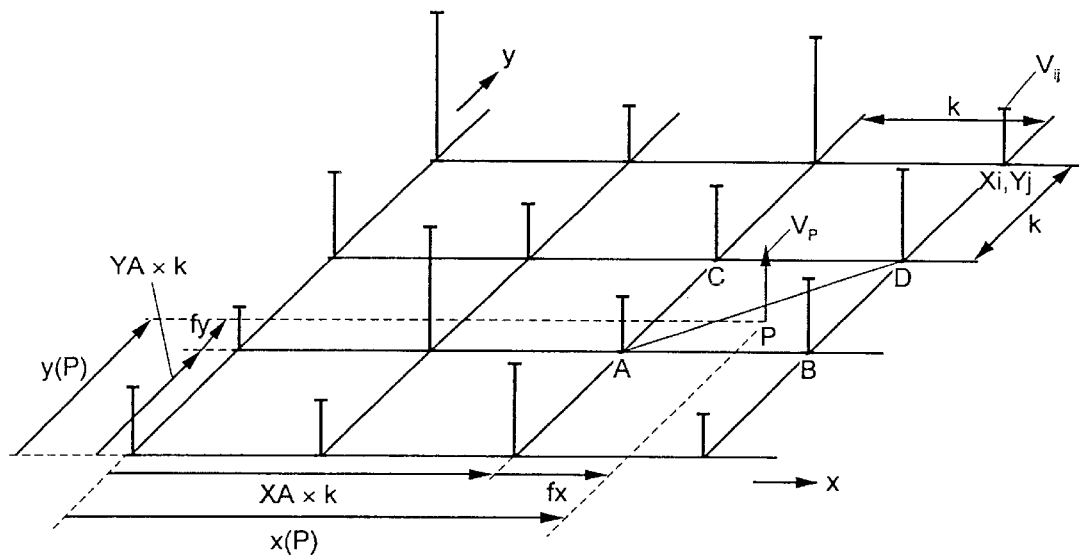
FIG. 4 is a two-dimensional color space with grid points and supporting values at the grid points.

FIG. 4 shows a two-dimensional color space having the components x and y that are shown in a plane. The value range of both components is divided into sections of respectively k steps after which respectively one grid point is provided. When the entire value range of the components comprises, for example, 256 digital steps and k=8 is selected, 256/8=32 grid points derive per component. The two-dimensional color plane is then divided into 32×32= 1024 grid points (Xi, Yj). Respectively 2×2 neighboring grid points form a sub-quadrant. A grid table memory 5 having 1024 memory locations would thus be required. One supporting value for each grid point is stored therein. The supporting values are shown in FIG. 4 as function values $V_{ij}$ of different heights.

An interpolated output component $V_P$ is to be calculated for an input color value at the point P having the components x(P) and y(P). To that end, the sub-quadrant (ABCD) in which the point P to be interpolated lies is identified first. The components x(P) and y(P) are split into a multiple of k and a remainder:

$$x(P) = XA \times k + fx \tag{1a}$$

$$y(P) = YA \times k + fy \tag{1b}$$

The multiple values XA and YA identify the grid point A in the sub-quadrant (ABCD); the remainders fx and fy identify the position of the point P within the sub-quadrant (ABCD). The multiple values XA and YA can, for example, be acquired from the more-significant bits of the components x(P) and y(P), and the remainder values fx and fy can be acquired from the low-significant bits of these components. In the above example with k=8 and 256 steps per component, the five more-significant bits of x(P) and y(P) correspond to the multiple values xa and ya, and the three low-significant bits correspond to the remainders fx and fy.

The address of the grip point A in the grip table memory 5 derives from the multiple values XA and YA on the basis of an address calculation that is dependent on the memory organization. According to a standard memory organization and for the above example of 32 grid points per component, for example, the grid points on the x-axis are allocated to the memory addresses 0 ... 31, the grid points that lie parallel thereto at the y-distance of k steps are allocated to the memory addresses 32 ... 63, the grid points in the y-distance of 2×k steps are allocated to the memory addresses 64 ... 95, etc. Given this memory organization, the addresses of the corner points of the sub-quadrant (ABCD) derive from:

$$\text{Address } A = YA \times 32 + XA \tag{2a}$$

$$\text{Address } B = YA \times 32 + (XA+1) \tag{2b}$$

$$\text{Address } C = (YA+1) \times 32 + XA \tag{2c}$$

$$\text{Address } D = (YA+1) \times 32 + (XA+1) \tag{2d}$$

The addresses of all corner points of the sub-quadrant (ABCD) can thus be calculated in a simple way from the multiple values XA and YA.

An interpolation method that is linear in x-direction and y-direction is inventively employed for calculating the interpolated output value $V_P$. To that end, the sub-quadrant (ABCD) is divided into two triangles (ABD) and (ACD) by a diagonal parting line, and a respective interpolation plane is erected between the supporting values at the corner points of the triangles.

Figure 5:
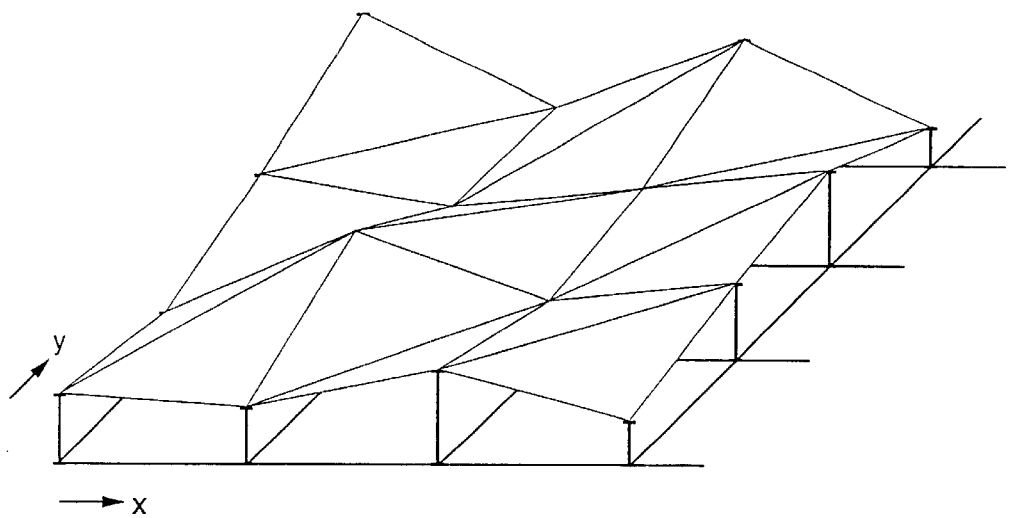
FIG. 5 is a two-dimensional color space with grid points and interpolation planes that are respectively erected between three supporting values.

FIG. 5 shows the triangular interpolation planes between the supporting values. Dependent on whether the point P lies in the triangle (ABD) or in the triangle (ACD), the output value $V_P$ is interpolated in the corresponding interpolation plane.

Figure 6:
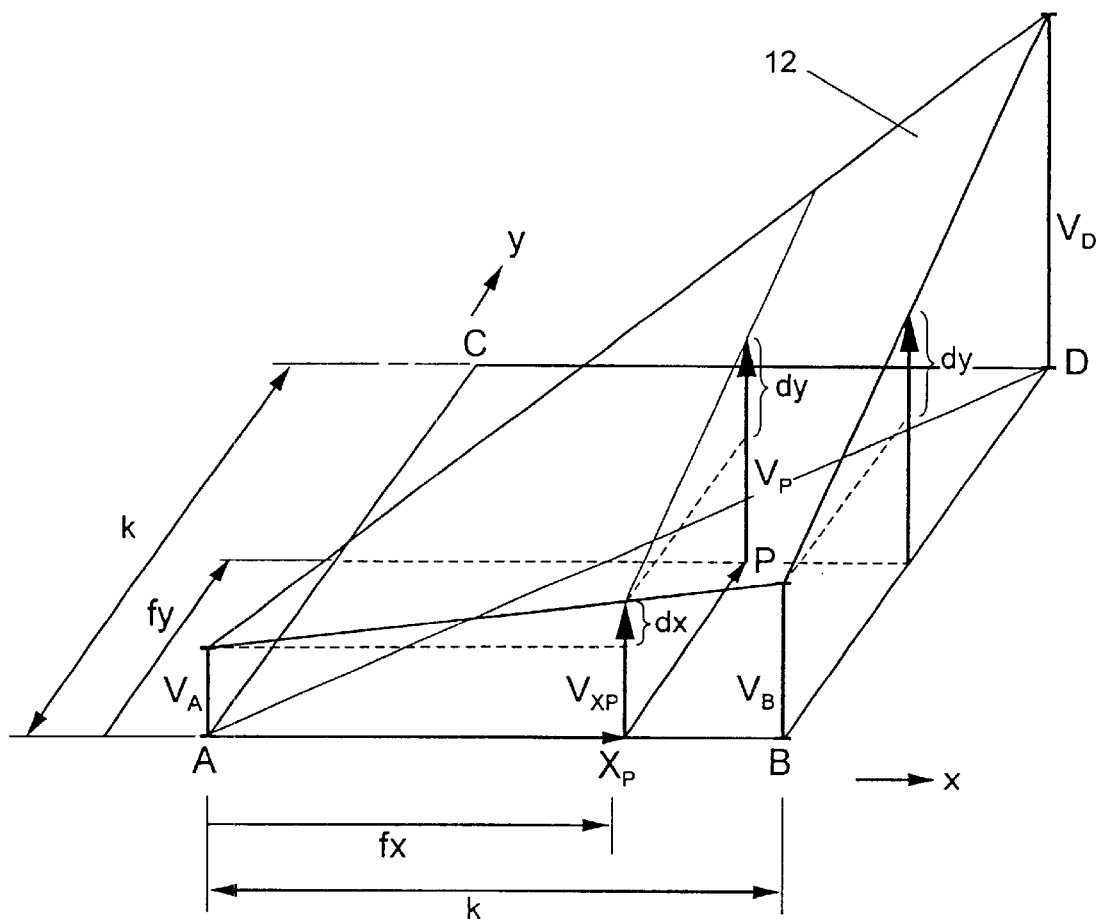
FIG. 6 shows the interpolation on a first interpolation plane in a sub-quadrant of the two-dimensional color space.

FIG. 6 illustrates the calculation of the output value $V_P$ for that case wherein the point P lies in the triangle (ABD). The interpolation plane (12) is erected between the supporting values $V_A$, $V_B$ and $V_D$. The position of the point P with reference to the corner point A is identified by the remainders fx and fy. First, an intermediate value $V_{XP}$ is interpolated in x-direction at the distance fx from the point A, i.e. at the point $X_P$. The output value $V_P$ is then interpolated in y-direction proceeding from the point $X_P$ at the distance fy. As can be seen from FIG. 6, the following relationships are valid:

$$V_{XP}=V_A+dx \qquad (3a)$$

$$V_P=V_{XP}+dy=V_A+dx+dy \qquad (3b)$$

The delta values dx derives from the supporting values $V_A$ and $V_B$ and from the relationship fx to k:

$$dx=(V_B-V_A)\times fx/k \qquad (4)$$

What is valid for the delta values dy is that it has the same value on the line $X_P \ldots P$ as on the line $B \ldots D$ since the interpolation plane 12 has the same slope everywhere in y-direction. Therefore, dy derives as:

$$dy=(V_D-V_B)\times fy/k \qquad (5)$$

After the insertion of relationships 4 and 5 into the relationship (3b) one obtains the following for the interpolated output value $V_P$:

$$V_P=1/k\times\{V_A\times k+(V_B-V_A)\times fx+(V_D-V_B)\times fy\} \qquad (6a)$$

$$V_P=1/k\times\{V_A\times(k-fx)+V_B\times(fx-fy)+V_D\times fy\} \qquad (6b)$$

Figure 7:
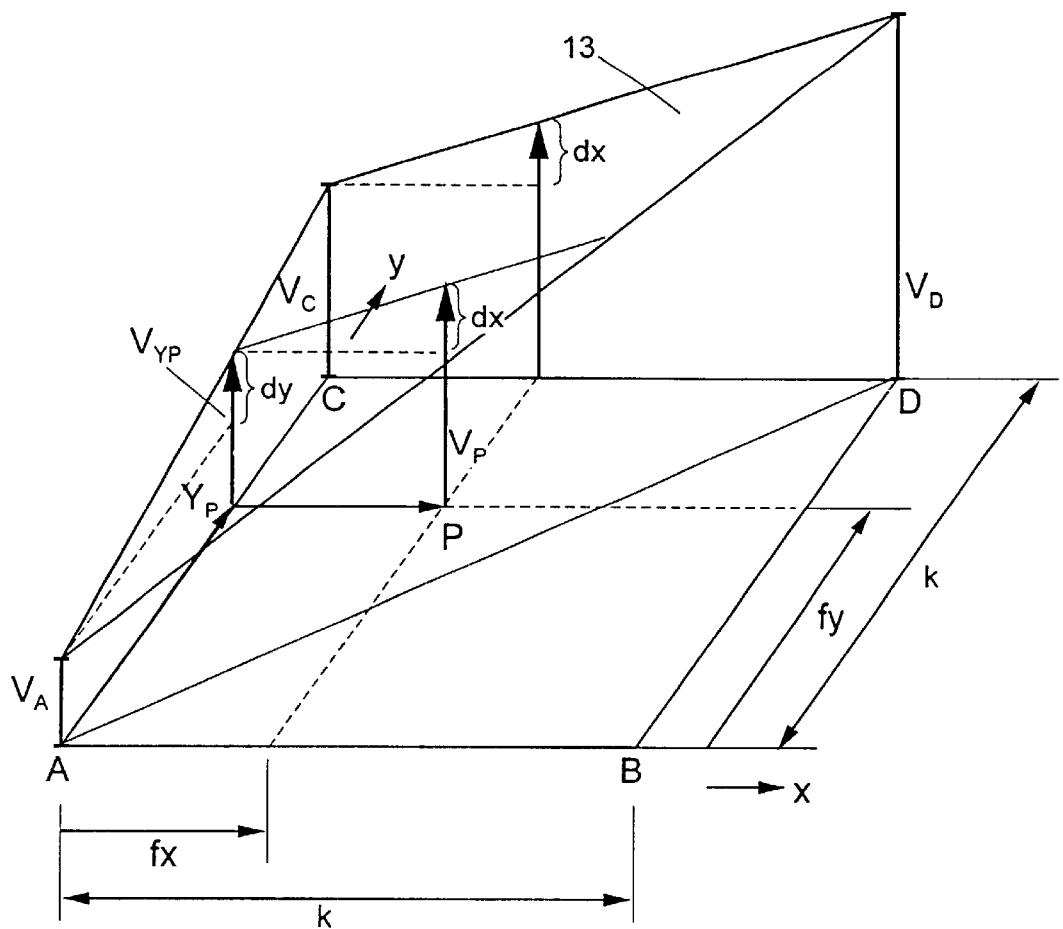
FIG. 7 shows the interpolation on a second interpolation plane in a sub-quadrant of the two-dimensional color space.

FIG. 7 shows the calculation of the interpolated output value $V_P$ for that case wherein the point P lies in the triangle (ACD), i.e. the interpolation occurs on the interpolation plane 13. An intermediate value $V_{YP}$ is then interpolated first in y-direction at the distance fy, i.e. at the point $Y_P$, and the output value $V_P$ is subsequently interpolated at the distance fx in x-direction proceeding from $Y_P$. In this case, $V_P$ derives as:

$$V_P=V_A+dy+dx \qquad (7)$$

Valid for the delta values dy and dx are:

$$dy=(V_C-V_A)\times fy/k \qquad (8a)$$

$$dx=(V_D-V_C)\times fx/k \qquad (8b)$$

In this case, too, the delta values dx can be calculated on the line $C \ldots D$ and can then be transferred onto the line $Y_P \ldots P$ since the slope of the interpolation plane 13 is the same everywhere in x-direction. By insertion of the relationships (8a) and (8b) into the relationship 7, one obtains the following for the interpolated output value $V_P$:

$$V_P=1/k\times\{V_A\times k+(V_C-V_A)\times fy+(V_D-V_C)\times fx\} \qquad (9a)$$

$$V_P=1/k\times\{V_A\times(k-fy)+V_C\times(fy-fx)+V_F\times fx\} \qquad (9b)$$

The two instances that have been set forth, that the point P lies in the triangle (ABD) or, respectively, in the triangle (ACD), can be combined to form a generally valid interpretation rule. The triangle in which the point lies is dependent on the size of the remainders fx and fy:

$$fx \geq fy: P \text{ lies in the triangle } (ABD) \qquad (10a)$$

$$fy \geq fx: P \text{ lies in the triangle } (ACD) \qquad (10b)$$

When the greater of the remainders is generally referenced as fgr and the smaller is referenced as fkl $$fgr=\text{greater value of } (fx, fy) \qquad (11a)$$

$$fkl=\text{smaller value of } (fx, fy) \qquad (11b)$$

and when the supporting value that neighbors $V_A$ in the direction of fgr is referenced $V_{gr}$ and the supporting value that neighbors $V_{gr}$ in the direction of fkl is referenced $V_{kl}$, then the relationships (6b) and (9b) can be combined to form an interpolation rule:

$$V_P=1/k\times\{V_A\times(k-fgr)+V_{gr}\times(fgr-fkl)+V_{kl}\times fkl\} \qquad (12)$$

Of course, the interpolation rule can also be formulated on the basis of the relationships (6a) and (9a) or on the basis of further relationships derived therefrom by mathematical transformations.

Figure 8:
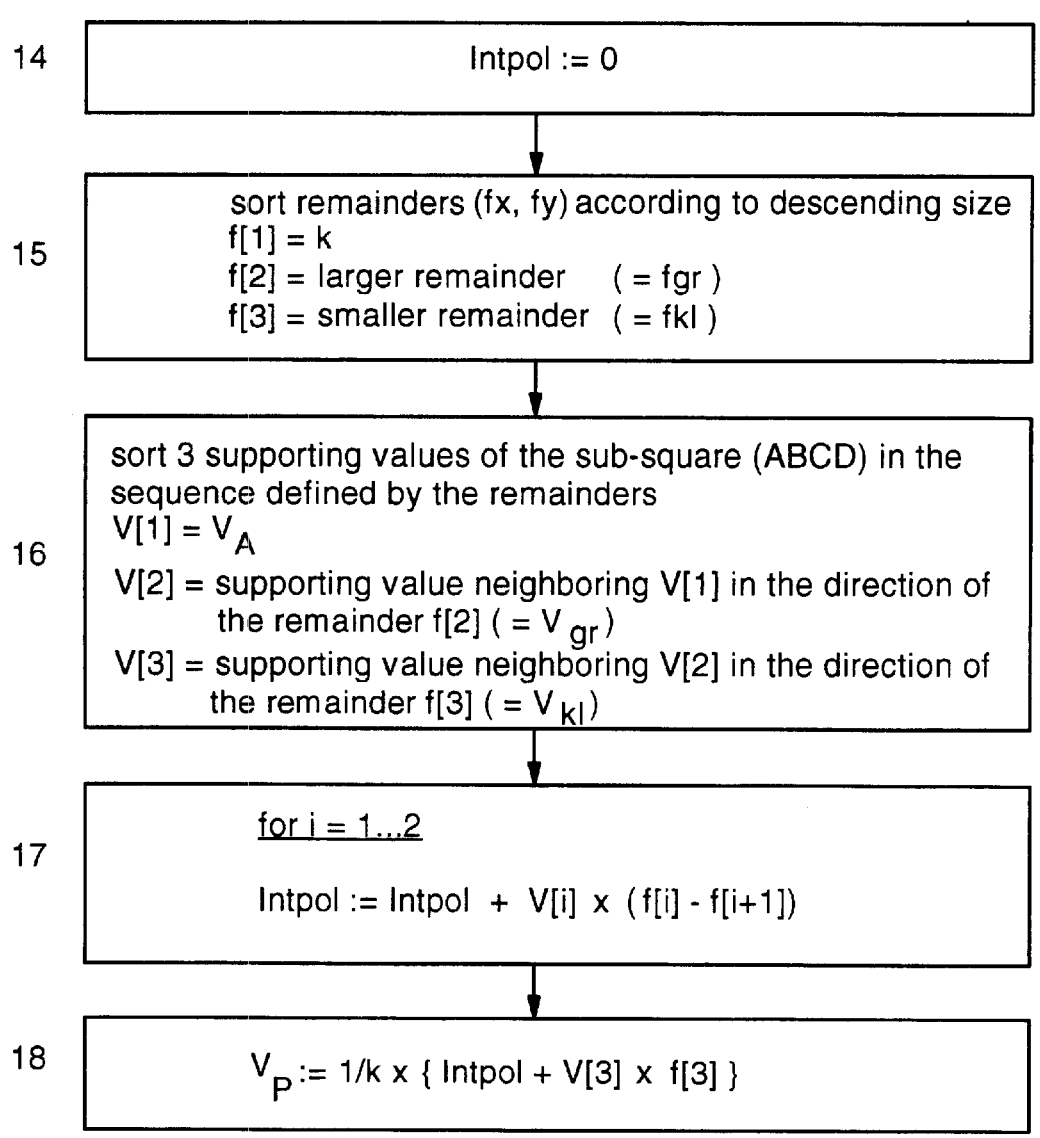
FIG. 8 is a flow chart of the interpolation rule in the two-dimensional color space.

FIG. 8 shows this generalized interpretation rule again as a flow chart. In the first step 14, a variable Interpol is set to 0 in which sub-values of the interpolation are summed up. In Step 15, the grid point distance k and the remainders fx and fy are sorted according to descending size and are written into an array f[1 . . . 3]. In Step 16, the supporting value $V_A$ and two further supporting values of the sub-quadrant (ABCD) are written into an array V[1 . . . 3]. The supporting values are thereby sorted in the sequence that is prescribed by the remainders in the array f[1 . . . 3], and are sorted according to descending size. $V_A$ is written into the position V[1], the supporting value that, proceeding from V[1] neighbors in the direction of the remainder located in f[2] is written into the position V[2], and the supporting value that, proceeding from V[2], neighbors in the direction of the remainder located in f[3] is written into the position V[3]. What the expression "in the direction of the remainder located in f[i] means is: in the direction of the component of the color space to which the remainder f[i] belongs. A loop operation for the running variables i=1 . . . 2 is implemented in the step 17, i.e. it is implemented twice in this case. A coefficient is calculated from the array values f[i] and f[i+1], is subsequently multiplied by the supporting value V[i] and the result is added to the previous value for Intpol. In the last step 18, finally, the last values f[3] and V[3] from the arrays are also multiplied, added to Intpol and divided by k. The result is the value $V_P$.

This general interpolation method can now be expanded for an n-dimensional color space. For a color space having n components of 256 steps each and a grid point spacing k steps, one obtains a supporting value grid with $(256/k)^n$ grid points. A sub-space in which the point P to be interpolated is located then has $2^n$ corner points. The position of the sub-space derives from the splitting of the component $q_s$ of the point P into a multiple of k and into a remainder.

$$q_s(P) = QA_s \times k + f_s \quad (s=1 \ldots n) \quad (13)$$

The corner point A at the origin of the sub-space is identified by the multiple values $QA_s$ and the position of the point P in the sub-space derives from the remainders fs. When the remainders sorted according to descending size are referenced $f_{g1}, f_{g2}, \ldots f_{gn}$ and the supporting values respectively neighboring in the direction of these remainders are referenced $V_{g1}, V_{g2}, \ldots V_n$, then relationship (12) can be generalized to n dimensions:

$$V_P = 1/k \times \{V_A \times (k - f_{g1}) + V_{g1} \times (f_{g1} - f_{g2}) + \ldots + V_{g(n-1)} \times (f_{g(n-1)} - f_{gn}) + V_{gn} \times f_{gn}\} \quad (14)$$

The relationship 14 describes the interpolation on an interpolation "plane" in the n-dimensional color space that proceeds through n+1 corner points of the sub-space in which the point P lies.

Figure 9:
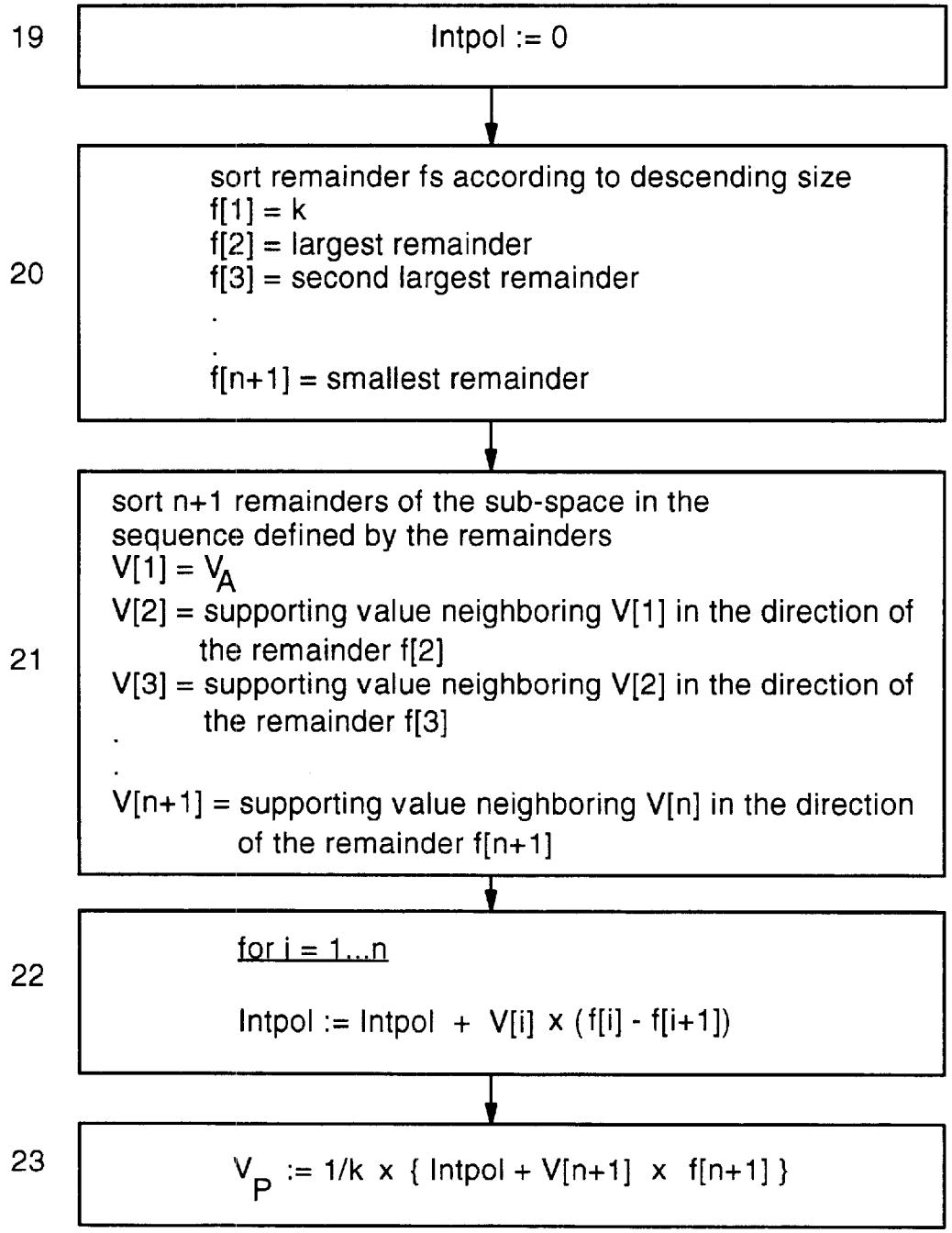
FIG. 9 is a flow chart for the interpolation rule in the n-dimensional color space.

FIG. 9 shows the interpolation rule of the n-dimensional color space as a flow chart. In the first step 19, the variable Intpol is set to zero in which sub-values of the interpolation are summed up. In step 20, the grid point spacing k and the remainders $f_s$ are sorted according to descending size and written into an array f[1 ... n+1]. In step 21, the supporting value $V_A$ and n further supporting values of the sub-space in which the point P lies are written into an array V[1 ... n+1]. The supporting values are thereby sorted in the sequence that is predetermined by the sorting of the remainders in the array f[1 ... n+1]. $V_A$ is written into the position V[1], the supporting value neighboring in the direction of the remainder located in f[2] proceeding from V[1] is written into the position V[2], the supporting value neighboring in the direction of the remainder located in f[3] proceeding from V[2] is written into the position V[3], etc. The expression "neighboring" in the direction of the remainder located in f[i] means: in the direction of the component of the color space to which the remainder f[i] belongs. In the step 22, a loop operation is implemented for the run variable i=1 ... n, i.e. it is implemented n-times in this case. A coefficient is calculated from the array values f[i] and f[i+1}, is subsequently multiplied by the supporting value V[i], and the result is added to the previous value for Intpol. In the last step 23, finally, the last values f[n+1] and V[n+1] from the arrays are multiplied, added to Intpol and divided by k. The result is the interpolated output value $V_P$.

Further modifications of the interpolation sequence are possible by mathematical reformulation of the relationship 14. Thus, for example, the remainders can also be sorted according to ascending size, and the selection and sorting of the sorting values can begin with the supporting value that lies "diagonally" opposite the supporting value $V_A$ in the sub-space, i.e. that is farthest from $V_A$. The selection of the supporting values then occurs in the reverse sequence, whereby $V_A$ is selected as last supporting value.

Although various minor changes and modifications might be proposed by those skilled in the art, it will be understood that my wish is to include within the claims of the patent warranted hereon all such changes and modifications as reasonably come within my contribution to the art.

I claim:

1. A method for interpolation of color values for color space transformation from an input color space into an output color space, whereby the input color space is divided into a multi-dimensional grid, transformed components of the output color space are prescribed for grid points as supporting values, and transformed components of the output color space for input colors that lie between the grid points are acquired by interpolation of the supporting values, comprising the steps of:

dividing components of an input color to be interpolated into a multiple of grip point spacing and into a remainder;

determining a sub-frame from the multiples of the grid point spacing, namely a sub-space in which the input color to be interpolated lies and that is limited by respectively neighboring grid points in the components of the input color space;

sorting the remainders according to their size;

selecting and sorting supporting values at limiting grid points of the sub-space in a sequence, the sequence being defined by a sequence of the sorted remainders;

forming interpolation coefficients from the sorted remainders; and operating the interpolation coefficients with the sorted supporting values to form interpolated components of the output color space.

2. The method according to claim 1 wherein a number of dimensions of the input color space is arbitrary.

3. The method according to claim 1 wherein a number of dimensions of the output color space is arbitrary.

4. The method according to claim 1 wherein the selection and sorting of the supporting values occurs according to component directions of the sorted remainders, whereby a supporting value at an origin of the sub-space is selected as a first supporting value;

proceeding from the first supporting value in a direction of the component that has a highest remainder, a supporting value at a neighboring grid point is selected as a second supporting value;

proceeding from the second supporting value in a direction of the component that has the second highest remainder, a supporting value at a neighboring grid point is selected as a third supporting value; and proceeding from a penultimate supporting value in a direction of a component that has a lowest remainder, a supporting value at a neighboring grid point is selected as a last supporting value.

5. The method according to claim 1 wherein n+1 supporting values at the neighboring grid points of the sub-space are selected for the interpolation in an n-dimensional input color space.

6. A method for interpolation of color values for color space transformation from an input color space into an output color space, comprising the steps of:

dividing the input color space into a multi-dimensional grid;

prescribing transformed components of the output color space for grid points as supporting values;

dividing components of an input color to be interpolated into a multiple of grid point spacing and into a remainder;

determining a sub-frame from the multiples of the grid point spacing, namely a sub-space in which the input color to be interpolated lies and that is limited by respectively neighboring grid points in the components of the input color space;

sorting the remainders according to their size;

selecting and sorting supporting values at limiting grid points of the sub-space in a sequence, the sequence being defined by a sequence of the sorted remainder;

forming interpolation coefficients from the sorted remainders;

operating the interpolation coefficients with the sorted supporting values to form interpolated components of the output color space; and acquiring transformed components of the output color space for input colors that lie between the grid points by interpolation of the supporting values.

* * * * *